United States Patent [19]

Sugino

[11] Patent Number: 4,978,551
[45] Date of Patent: Dec. 18, 1990

[54] SIMULATED FISH MEAT AND METHOD OF PRODUCING SAME

[75] Inventor: Yoshito Sugino, Ishikawa, Japan

[73] Assignee: Sugiyo Co., Ltd., Ishikawa, Japan

[21] Appl. No.: 390,881

[22] Filed: Aug. 8, 1989

[51] Int. Cl.$^5$ .......................... A23L 1/05; A23L 1/325
[52] U.S. Cl. .................................... 426/573; 426/518; 426/643
[58] Field of Search ........................ 426/573, 643, 518

[56] References Cited

U.S. PATENT DOCUMENTS

| | | | |
|---|---|---|---|
| 4,427,704 | 1/1984 | Cheney et al. | 426/573 |
| 4,612,201 | 9/1986 | Maruyama et al. | 426/643 |
| 4,652,455 | 3/1987 | Sugino et al. | 426/643 |

FOREIGN PATENT DOCUMENTS 0159038 10/1985 European Pat. Off. .
6041469 5/1985 Japan .

OTHER PUBLICATIONS

Cowles, F.; 1936, 1001 Sandwiches, Little, Brown and Co., pp. 229–231.
Patent Abstracts of Japan, vol. 9, No. 171 (C-291) (1984), Jul. 16, 1985.
Patent Abstracts of Japan, vol. 10, No. 90 (C-337) (2147), Apr. 8, 1986.

*Primary Examiner*—Donald E. Czaja
*Assistant Examiner*—Helen Pratt
*Attorney, Agent, or Firm*—Fidelman and Wolffe

[57] ABSTRACT

A gel-like edible composition simulating fresh fish meat comprising a mixture of mannan, fish meat protein, water, a polysaccharide and a seasoning, the amount of said mannan being 0.5% by weight to 9% by weight, the amount of said fish meat protein being 1.3% by weight to 12% by weight, and the total amount of said mannan and fish meat protein being 2.0% by weight to 19% by weight. A gel-like food product made of the edible composition having been heat-coagulated is also provided.

6 Claims, No Drawings

SIMULATED FISH MEAT AND METHOD OF PRODUCING SAME

BACKGROUND OF THE INVENTION

This invention relates to a gel-like edible composition simulating raw fish meat and a food product which is quite similar in taste and texture to the raw meat of natural fish.

There are known various types of food products which include mannan and/or fish meat protein in the form of fish meat or "surimi", a Japanese word for fish meat paste.

A typical food product including mannan is devil's tongue jelly or "konnyaku" in Japanese, which is produced by adding a calcium salt to a water solution of mannan for gelation of the solution. Typical food products including fish meat "surimi" are "kamaboko" and "chikuwa", both traditional Japanese food products, which are produced by grinding fish meat "surimi" mixed with salt and causing the mixture to gel.

There are also known various types of food products including both mannan and fish meat "surimi", which are produced by adding mannan to fish meat "surimi" to increase the gel strength of the fish meat "surimi" and heating the mixture for coagulation.

Each of these conventional food products has a texture which gives a particular oral sensation when it is eaten. However, they generally have a rather strong resistance to mastication, giving a particular feeling of a kind of hardness to the mouth.

SUMMARY OF THE INVENTION

The primary object of the invention is to provide a gel-like edible composition simulating raw fish meat and a food product made of the composition which has an appropriate degree of elasticity and gives an oral sensation quite similar to that of the raw meat of natural fish when it is eaten.

Another object of the invention is to provide a method of producing such a food product as mentioned above.

The edible composition prepared in accordance with the invention comprises a gel-like mixture of mannan, fish meat protein, water, a polysaccharide, and seasonings, wherein the amount of mannan is 0.5% to 9% by weight, the amount of fish meat protein is 1.3% to 12% by weight, and the total amount of mannan and fish meat protein is 2.0% to 19% by weight.

The mannan used in the present invention can be devil's tongue powder (or "konnyaku-ko" in Japanese) from which devil's tongue jelly or "konnyaku", a food very popular and widely consumed in Japan, is made. The mannan can also be glucomannan produced by refining devil's tongue powder. Glucomannan has a viscosity about three times that of devil's tongue mannan, and is more suitable for the composition and product of the invention. Particularly suitable is glucomannan having a high molecular weight refined by using alcohol.

The amount of mannan contained in the edible composition and food product of the invention is 0.5% to 9% by weight. A smaller amount of mannan makes the product obtained too soft, whereas a greater amount makes the product too hard, so that in either case the product cannot give a desired oral sensation.

Mannan is conveniently used in the form of mannan paste prepared by dissolving mannan in water or soaking it with water. In this case, the concentration of mannan is 1% to 15%. With a higher concentration it takes a longer time to dissolve mannan and to mix the mannan paste with fish meat paste, with resulting marked reduction of efficiency of production. A concentration of less than 1% is as effective as in the above range of concentration. However, such a low concentration requires much time and labor in weighting and other operations and therefore is not preferred. The preferable concentration range of mannan is 2% to 10%.

A polysaccharide such as cereal powder, starch, or α-starch may be added to the mannan paste to improve the ability of the mannan gel obtained to retain water and seasonings in the gel as well as to keep the contour of the gel.

The fish meat protein used in the invention may comprise either fish meat or fish meat "surimi", or both of them.

The "surimi" is obtained in the following manner: The flesh or meat is separated from a fish having white flesh or meat such as cod, sea bream, sea eel, etc. and crushed or squeezed. The mass of fish meat is then rinsed in water so that watersoluble materials are removed from the meat. The resulting fish meat is "surimi". Salt may be added to the "surimi".

The fish meat is obtained by removing the guts, bones, etc. from such fish as mentioned above. The fish meat contains water-soluble materials, so that it is possible to add fish meat protein to the gel-like food product obtained without losing the flavor and taste characteristic of the fish meat. Therefore, fish meat is preferably used. From the economical point of view, however, it is more preferable to use fish meat together with fish meat "surimi".

The above-mentioned "surimi" or fish meat is used in the form of paste prepared in the same manner as in the conventional method of preparing raw material for "kamaboko", a traditional Japanese food made of heat-coagulated fish meat paste. One example of preparing fish meat paste is as follows: 40 to 120 parts by weight of iced water is added to 100 parts by weight of fish meat "surimi", with a proper amount of additives such as starch, sugar and seasonings, as occasions demand. The mixture is well kneaded into viscous paste, to which 1.5% to 3.5% by weight of common salt is added, and kneading is continued to elute salt-soluble proteins from the mixture being kneaded, so that a mass of fish meat paste is obtained.

The amount of fish meat protein to be contained in the final product of the invention should be 1.3% to 12% by weight. If the amount is less than 1.3%, the final product obtained will give an oral sensation similar to that experienced when devil's tongue jelly is eaten. On the contrary, if the amount exceeds 12%, the final product will give an oral sensation approximating that experienced when "kamaboko" is eaten. In either case it is impossible to obtain a satisfactory oral sensation the invention intends to attain.

The preferred range of the amount of mannan and that of fish meat protein are as mentioned above. The sum of the amount of mannan and that of fish meat protein to be contained in the final product of the invention should be 2.0% to 19% by weight. If the sum is less than 2.0%, the product obtained is too soft, and if the sum exceeds 19%, the product is too hard. In either case it is impossible to obtain the intended oral sensation.

The components of the product of the invention other than the above-mentioned mannan and fish meat protein are water, polysaccharides, seasonings, etc. The amounts of these components are selected so as not to deteriorate the oral sensation provided by the product when it is eaten.

To make a gel-like food product simulating raw fish meat from the above-mentioned gel-like edible composition simulating raw fish meat, the composition is coagulated by heating it above 65° C. in a well-known manner.

In accordance with the method of the invention, a mannan solution containing 1% to 15% by weight of mannan is prepared, and fish meat "surimi" and/or fish meat are mixed and kneaded with common salt, starch and seasonings to obtain fish meat paste, the amounts of these components being selected so that the fish meat paste obtained contains 3% to 5% by weight of fish meat protein. Then one part by weight of the mannan solution and 0.25 to 4 parts by weight of the fish meat paste are mixed, and the mixture is heated above 65° C. to obtain a food product simulating raw fish meat.

DESCRIPTION OF EXAMPLES

The invention will be described further by way of the following examples.

EXAMPLE 1

65 g of glucomannan and 120 g of α-starch were added to 3000 ml of water and stirred sufficiently to obtain 3170 g of uniform mannan paste. On the other hand, 723 g of fish meat "surimi", 500 g of slices of salmon meat, 86 g of corn starch, 50 g of a seasoning and 580 g of ice water were mixed and kneaded until the mixture became a mass of uniform paste, to which 45 g of common salt was added, and the mixture was further kneaded to obtain 1984 g of fish meat paste.

Samples No. 1 through No. 6 of gel-like food product simulating raw fish meat are prepared in the following manner:

The amounts in part by weight given in TABLE 1 were taken from the mannan paste and the fish meat paste prepared in the above-mentioned manners, and then fully kneaded to obtain a mass of uniform paste. Each lot of the paste was put into a 5 cm×5 cm×4 cm plastic container, which was held in a water bath kept at 95° C. for 25 to 45 minutes to cause the paste to coagulate.

The samples of gel-like food product thus prepared were then put in a freezer and kept at −25° C. for 15 hours, after which both the breaking stress and the jelly strength of the samples were measured. A plunger having a diameter of 10 mm was used in the measurement of the jelly strength. The results of the measurement are given in TABLE 1.

TABLE 1

| Sample No. | 1 | 2 | 3 | 4 | 5 | 6 |
|---|---|---|---|---|---|---|
| Mannan paste | 80 | 70 | 60 | 50 | 40 | 30 |
| Fish meat paste | 20 | 30 | 40 | 50 | 60 | 70 |
| Concentration of mannan (%) | 1.64 | 1.44 | 1.23 | 1.03 | 0.82 | 0.62 |
| Concentration of protein (%) | 1.31 | 1.97 | 2.63 | 3.29 | 3.95 | 4.60 |
| Breaking stress (g) | 160 | 150 | 130 | 130 | 160 | 180 |
| Jelly strength (g,cm) | 120 | 110 | 75 | 81 | 83 | 100 |

TABLE 1-continued

| Sample No. | 1 | 2 | 3 | 4 | 5 | 6 |
|---|---|---|---|---|---|---|
| (g,cm) | | | | | | |

Sensory tests were conducted with eight healthy adult persons as panelists, who ate the samples before they took lunch. All the samples were felt by all the panelists similar to raw fish meat, particularly, that of red salmon, although the samples were felt more or less different in hardness.

Samples were prepared in the same mannar as in the above-mentioned samples except that the mixed pastes put in the containers were stored in a freezer kept at −25° C. for 24 hours, after which they were heated in a water bath kept at 95° C. for 100 minutes. Sensory tests were conducted on the samples, with substantially the same results as in the tests previously conducted.

EXAMPLE 2

Samples No. 7 through 10 were prepared in the same manner as in EXAMPLE 1 except that the amount of glucomannan was 50 g and that of water was 1000 ml. The breaking stress and the jelly strength of the samples were measured. The results are given in TABLE 2.

TABLE 2

| Sample No. | 7 | 8 | 9 | 10 |
|---|---|---|---|---|
| Mannan paste | 80 | 60 | 40 | 20 |
| Fish meat paste | 20 | 40 | 60 | 80 |
| Concentration of mannan (%) | 4.00 | 3.00 | 2.00 | 1.00 |
| Concentration of protein (%) | 1.30 | 2.60 | 3.90 | 5.30 |
| Breaking stress (g) | 250 | 240 | 250 | 290 |
| Jelly strength (g,cm) | 190 | 170 | 180 | 230 |

Sensory tests were conducted on the samples. All the panelists had an oral sensation similar to that experienced when raw fish meat is eaten, particularly, the meat of sea bream or flounder having firm, elastic meat.

EXAMPLE 3

Samples No. 11 through No. 14 were prepared in substantially the same manner as in EXAMPLE 1 except that 60 parts by weight of mannan paste and 40 parts by weight of fish meat paste having the concentrations of mannan and protein, respectively, given in TABLE 3 were used. The breaking stress and the jelly strength of the food products obtained were measured. The results of the measurement are given in TABLE 3.

TABLE 3

| Sample No. | 11 | 12 | 13 | 14 |
|---|---|---|---|---|
| Concentration of mannan (%) | 3.33 | 2.50 | 2.00 | 1.43 |
| Concentration of protein (%) | 2.60 | 2.60 | 2.60 | 2.60 |
| Breaking stress (g) | 180 | 150 | 130 | 87 |
| Jelly strength (g,cm) | 130 | 110 | 83 | 49 |

EXAMPLE 4

Samples No. 15 through No. 20 were prepared in substantially the same manner as in EXAMPLE 1 except that 160 g of "konnyaku" powder was used instead of 65 g of glucomannan. The breaking stress and jelly strength of the samples were measured. The results of the measurement are given in TABLE 4.

TABLE 4

| Sample No. | 15 | 16 | 17 | 18 | 19 | 20 |
|---|---|---|---|---|---|---|
| Mannan paste | 80 | 70 | 60 | 50 | 40 | 30 |
| Fish meat paste | 20 | 30 | 40 | 50 | 60 | 70 |
| Concentration of mannan (%) | 4.05 | 3.54 | 3.04 | 2.53 | 2.03 | 1.52 |
| Concentration of protein (%) | 1.31 | 1.97 | 2.63 | 3.29 | 3.95 | 4.60 |
| Breaking stress (g) | 140 | 130 | 120 | 110 | 130 | 150 |
| Jelly strength (g,cm) | 115 | 110 | 70 | 75 | 75 | 90 |

The samples prepared with "konnyaku" powder in an amount 2 to 2.5 times that of glucomannan had substantially the same properties as the samples prepared with glucomannan.

EXAMPLE 5

50 g of glucomannan was disolved in 3000 g of water heated to 70° C., and 120 g of waxy starch was added to the mannan solution and well stirred to obtain a mass of uniform mannan paste. On the other hand, 750 g of fish meat "surimi", 600 g of ice water, 20 g of α-starch, 55 g of a seasoning and a small amount of an edible pigment were mixed and well kneaded into a mass of uniform paste, to which 170 g of fibrous tissues of cod and 22 g of common salt were added. The mixture was further kneaded to obtain a mass of fish meat paste.

The mannan paste and the fish meat paste obtained in the above mentioned manners were mixed into a mass of uniform paste, which was divided into two equal parts. One of the parts was shaped into a plate-like mass having a thickness of 5 cm, which was packed with a plastic film and stored in a freezer kept at −25° C. for 24 hours. The pack was then taken out of the freezer, defrosted and then steamed in a steamer for 10 minutes. After having been cooled by water, the product had a texture which gave an oral sensation similar to that of flexible raw fish meat.

The other of the two parts of the above-mentioned mixed paste was shaped into a sheet having a thickness of about 3 mm, which was heated in a steamer for 20 minutes. The sheet was then cut into smaller square sheets of 20 cm×20 cm and 7 cm×7 cm, respectively. 15 of these sheets were piled up into a multiple-layer mass, which was packed with a plastic film and stored in a freezer kept at −25° C. The mass was cut into slices like "sashimi", small rectangular slices of raw fish meat. A pattern of laminated layers similar to that of natural fish meat appeared in the cross section of the slices obtained in the above mentioned manner, and the products gave an oral sensation similar to that of raw fish meat.

What I claim is:

1. A method of producing a gel-like food product simulating raw fish meat, comprising the steps of:
    preparing a mannan solution containing from 1% by weight to 15% by weight of mannan;
    mixing surimi, fish meat, or both surimi and fish meat with common salt, a polysaccharide and a seasoning to form a fish meat protein mixture containing from 3% by weight to 15% by weight of fish meat protein, and kneading said fish meat protein mixture to form a fish meat paste;
    mixing 1 part by weight of said mannan solution with from 0.2 to 4 parts by weight of said fish meat paste to form a paste mixture; and kneading the paste mixture to form a mass of uniform paste; and
    heating said mass of uniform paste above 65° C. to form a heat-coagulated mass.

2. The method of claim 1, wherein said polysaccharide is starch.

3. The method of claim 1, further comprising the steps of:
    cutting said heat-coagulated mass into a plurality of sheets of a predetermined dimension;
    piling said sheets upon each other to form a multiple-layer mass; and
    cutting said multiple-layer mass perpendicularly to the direction in which said sheets are piled up into slices each having a cross-sectional pattern of piled layers simulating natural fish.

4. A gel-like food product simulating raw fish meat prepared according to a method comprising the steps of:
    preparing a mannan solution containing from 1% by weight to 15% by weight of mannan;
    mixing surimi, fish meat, or both surimi and fish meat with common salt, a polysaccharide and a seasoning to form a fish meat protein mixture containing from 3% by weight to 15% by weight of fish meat protein, and kneading said fish meat protein mixture to form a fish meat paste;
    mixing 1 part by weight of said mannan solution with from 0.2 to 4 parts by weight of said fish meat paste to form a paste mixture, and kneading the paste mixture to form a mass of uniform paste; and
    heating said mass of uniform paste above 65° C. to form a heat-coagulated mass.

5. A food product as recited in claim 4, wherein said polysaccharide is starch.

6. A food product as recited in claim 4, wherein said method further comprises the steps of:
    cutting said heat-coagulated mass into a plurality of sheets of a predetermined dimension;
    piling said sheets upon each other to form a multiple-layer mass; and
    cutting said multiple-layer mass perpendicularly to the direction in which said sheets are piled up into slices each having a cross-sectional pattern of piled layers simulating natural fish.

* * * * *